United States Patent
Buck et al.

(10) Patent No.: US 10,953,691 B2
(45) Date of Patent: Mar. 23, 2021

(54) APPARATUS FOR SECURING A TIRE TO A WHEEL

(71) Applicant: The Charles Machine Works, Inc., Perry, OK (US)

(72) Inventors: Michael D. Buck, Perry, OK (US); Blaine S. Talbot, Stillwater, OK (US); Jodi Vinyard, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 569 days.

(21) Appl. No.: 15/788,452

(22) Filed: Oct. 19, 2017

(65) Prior Publication Data

US 2018/0104985 A1    Apr. 19, 2018

Related U.S. Application Data

(60) Provisional application No. 62/410,213, filed on Oct. 19, 2016.

(51) Int. Cl.
*B60B 25/08* (2006.01)
*B60B 7/01* (2006.01)
*B60B 25/20* (2006.01)

(52) U.S. Cl.
CPC .............. *B60B 25/08* (2013.01); *B60B 7/01* (2013.01); *B60B 25/20* (2013.01); *B60B 2900/523* (2013.01)

(58) Field of Classification Search
CPC ......... B60B 25/04; B60B 25/10; B60B 25/12; B60B 25/14; B60B 25/08; B60B 25/20; B60B 7/01; B60C 15/0213; B60C 15/022; B60C 15/0226; B60C 15/0223
See application file for complete search history.

(56) References Cited

U.S. PATENT DOCUMENTS

| | | | | |
|---|---|---|---|---|
| 2,848,279 A | * | 8/1958 | Parker, Sr. .............. | B60B 25/16 301/64.5 |
| 3,604,485 A | * | 9/1971 | Schelkmann ....... | G01M 17/021 157/14 |
| 4,190,092 A | * | 2/1980 | Evans ..................... | B60B 21/10 152/381.4 |
| 4,206,797 A | * | 6/1980 | Holland, Sr. ........... | B60B 25/00 152/397 |
| 4,662,419 A | | 5/1987 | Winfield | |
| 4,709,738 A | | 12/1987 | Goodell et al. | |

(Continued)

FOREIGN PATENT DOCUMENTS

GB            354556         8/1931

OTHER PUBLICATIONS

Dragzine, "Interlocking Beadlock Design", pages from company website printed Sep. 22, 2017. six pages.

*Primary Examiner* — Scott A Browne
(74) *Attorney, Agent, or Firm* — Tomlinson McKinstry, P.C.

(57) ABSTRACT

A beadlock to secure a tire to a wheel. The beadlock comprises a first grip element and a second grip element. The first grip element is welded to the outer rim of a wheel. A bead of the tire is positioned over the first grip element. The second grip element has a plurality of rib elements angularly spaced around its periphery. The second grip element is secured to the first grip element such that the ribs grip the bead to hold it in place and secure the tire to the wheel.

21 Claims, 5 Drawing Sheets

(56) References Cited

U.S. PATENT DOCUMENTS

| | | | |
|---|---|---|---|
| 5,000,241 A | 3/1991 | Patecell | |
| 6,401,773 B1 * | 6/2002 | Cho | B60C 17/06 |
| | | | 152/158 |
| 2009/0151876 A1 * | 6/2009 | Rider | B60B 25/12 |
| | | | 157/1.33 |

* cited by examiner

APPARATUS FOR SECURING A TIRE TO A WHEEL

SUMMARY

The present invention is directed to a system comprising a wheel, a first grip element, a second grip element, and a tire. The first grip element is mounted on the wheel and has a planar grip surface. The second grip element has a planar grip surface and is secured to the first grip element. The tire is installed on the wheel and has a bead that is sandwiched between the grip surfaces of the first and second grip elements. A plurality of rib elements project from the grip surface of at least one of the grip elements.

The present invention is also directed to a beadlock comprising a first grip element, a second grip element and a plurality of bolts. The first grip element has a planar grip surface and a plurality of peripheral bolt holes. The second grip element has a planar grip surface and a plurality of peripheral bolt holes that correspond to the plurality of bolt holes within the first grip element. Each of the plurality of bolts is receivable within a corresponding pair of bolt holes within the first and second grip elements. A plurality of rib elements project from the grip surface of at least one of the grip elements.

The present invention is further directed to an apparatus. The apparatus comprises a curved wall having a curved top edge and an opposed curved bottom edge, and a ledge that is joined to an outer surface of the wall proximate its bottom edge. The ledge is orthogonal to the wall. The apparatus further comprises a plurality of planar rib elements that are angularly spaced about the wall. Each of the rib elements is joined to the outer surface of the wall.

DETAILED DESCRIPTION

Figure 1:
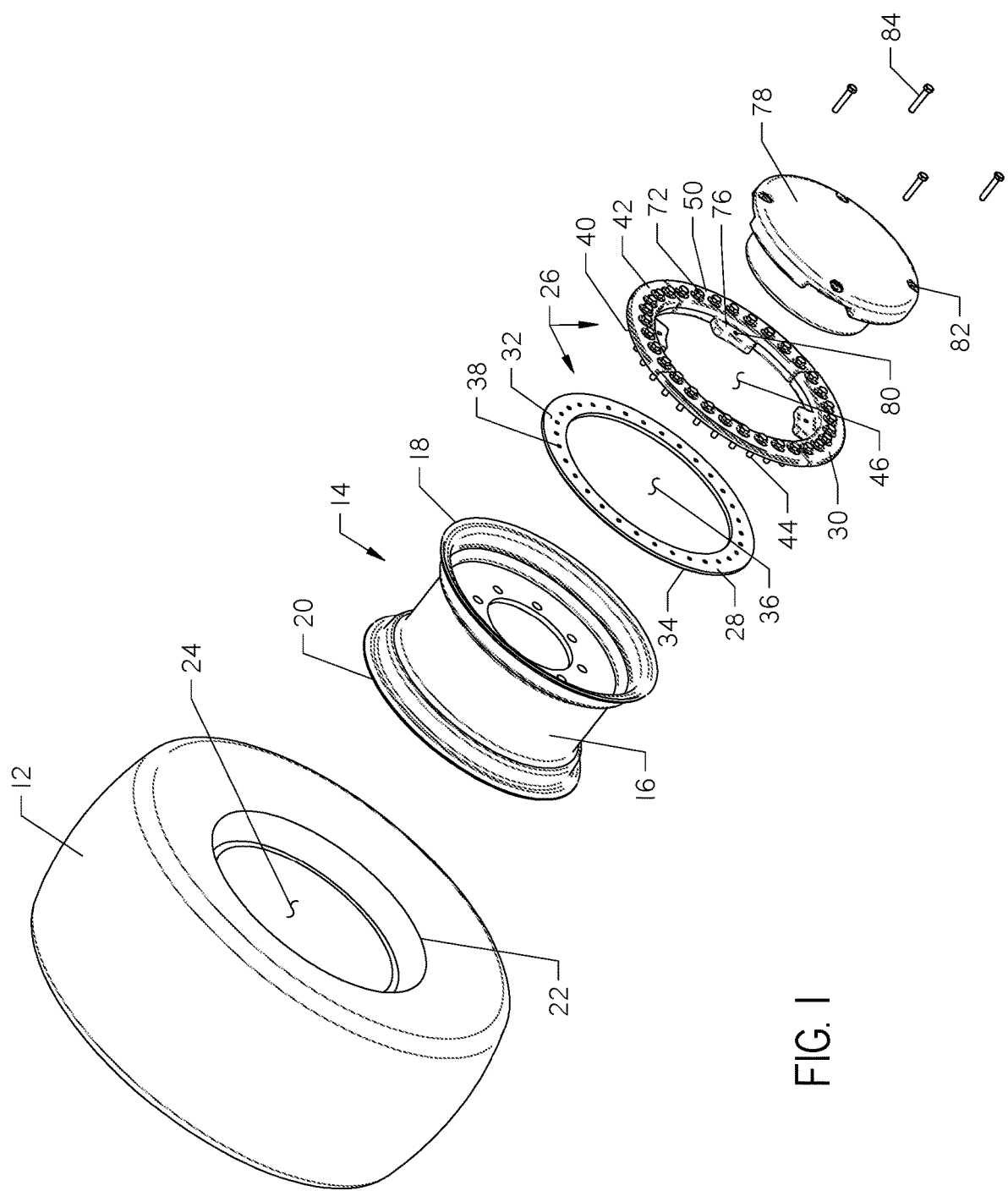
FIG. 1 is an exploded view of a beadlock system of the present invention.

With reference to FIG. 1, a beadlock system 10 is shown. The system 10 includes a tire 12 and a wheel 14. The system 10 may be used with each tire and wheel on a vehicle. The wheel 14 has a central hub 16 that spans between an outer rim 18 and an inner rim 20. The tire 12 has a bead 22 on each side. The bead 22 is the edge of the tire 12 proximate its central opening 24.

Normally, the tire 12 is positioned on the wheel 14 such that the beads 22 are tucked behind the outer and inner rims 18, 20 of the wheel 14. The friction between the rims 18, 20 and the beads 22, when the tire is inflated, helps to hold the tire 12 on the wheel 14. However, there may be instances when the tire 12 slips on the wheel 14. To prevent slippage, a beadlock 26, shown in FIG. 1, may be used to secure the bead 22 on one side of the tire 12 to the wheel 14.

Figure 2:
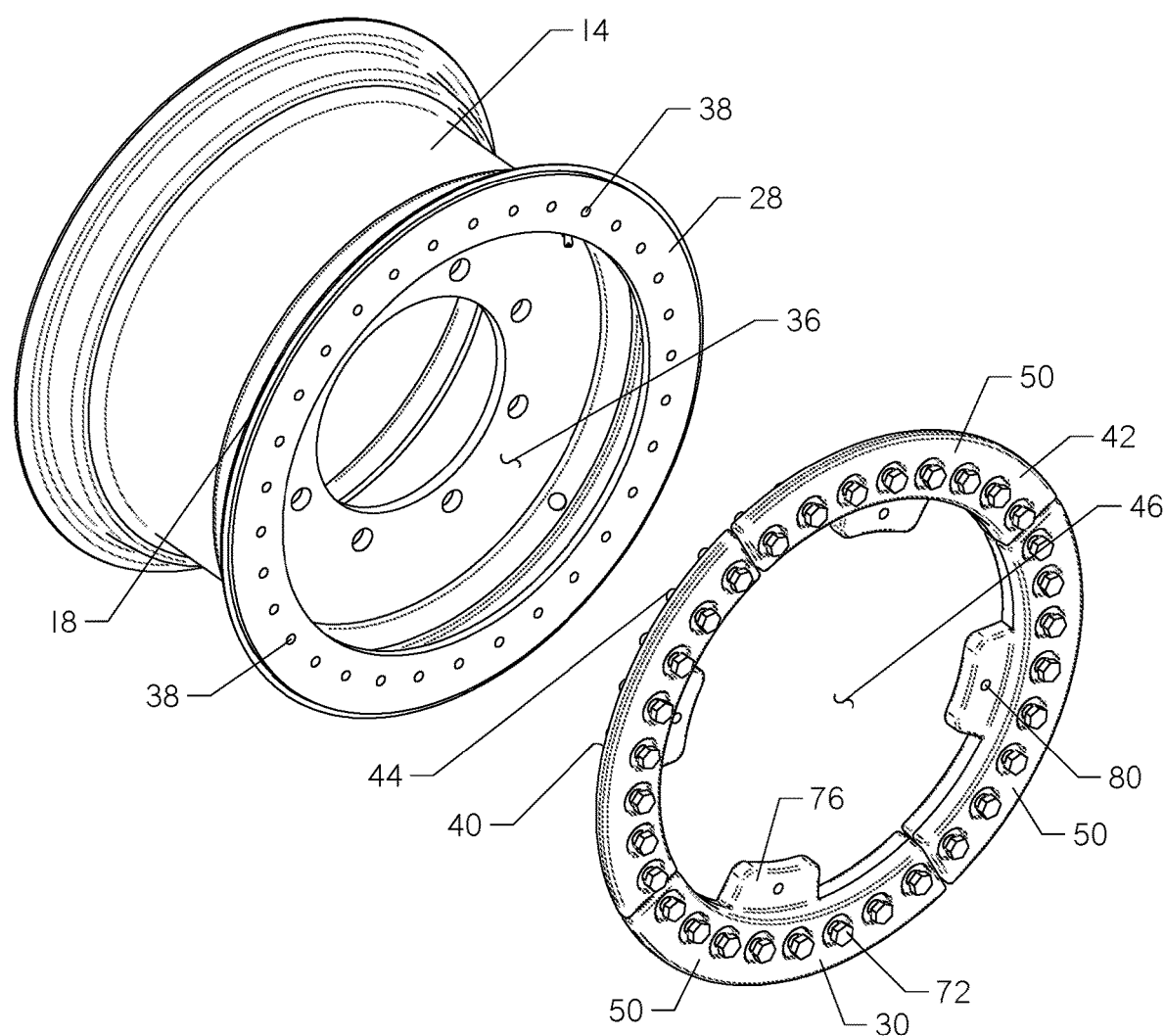
FIG. 2 is a perspective view of a first grip element of the beadlock attached to a wheel. A second grip element of the beadlock is shown removed for better display.

With reference to FIGS. 1-2, the beadlock 26 comprises a first grip element 28 and a second grip element 30. The grip elements 28, 30 are preferably made of metal and are circular in shape. The grip elements 28, 30 are sized to correspond with the size of the wheel 14 used with the beadlock system 10. The first grip element 28 has a planar grip surface 32 and a planar second side 34. A circular central opening 36 may be formed in the first grip element 28 that is concentric with the outer rim 18 of the wheel 14, as shown in FIG. 2. Alternatively, the first grip element 28 may not have a central opening 36 and may instead have a solid planar center.

The second side 34 of the first grip element 28 may be mounted or welded to the outer rim 18 of the wheel 14. This is done prior to installing the tire 12 on the wheel 14. Alternatively, the first grip 28 may be formed as an integral part of the wheel 14 during manufacturing of the wheel. The first grip element 28 also has a plurality of fastener openings or bolt holes 38 equally spaced around its periphery.

Figure 3:
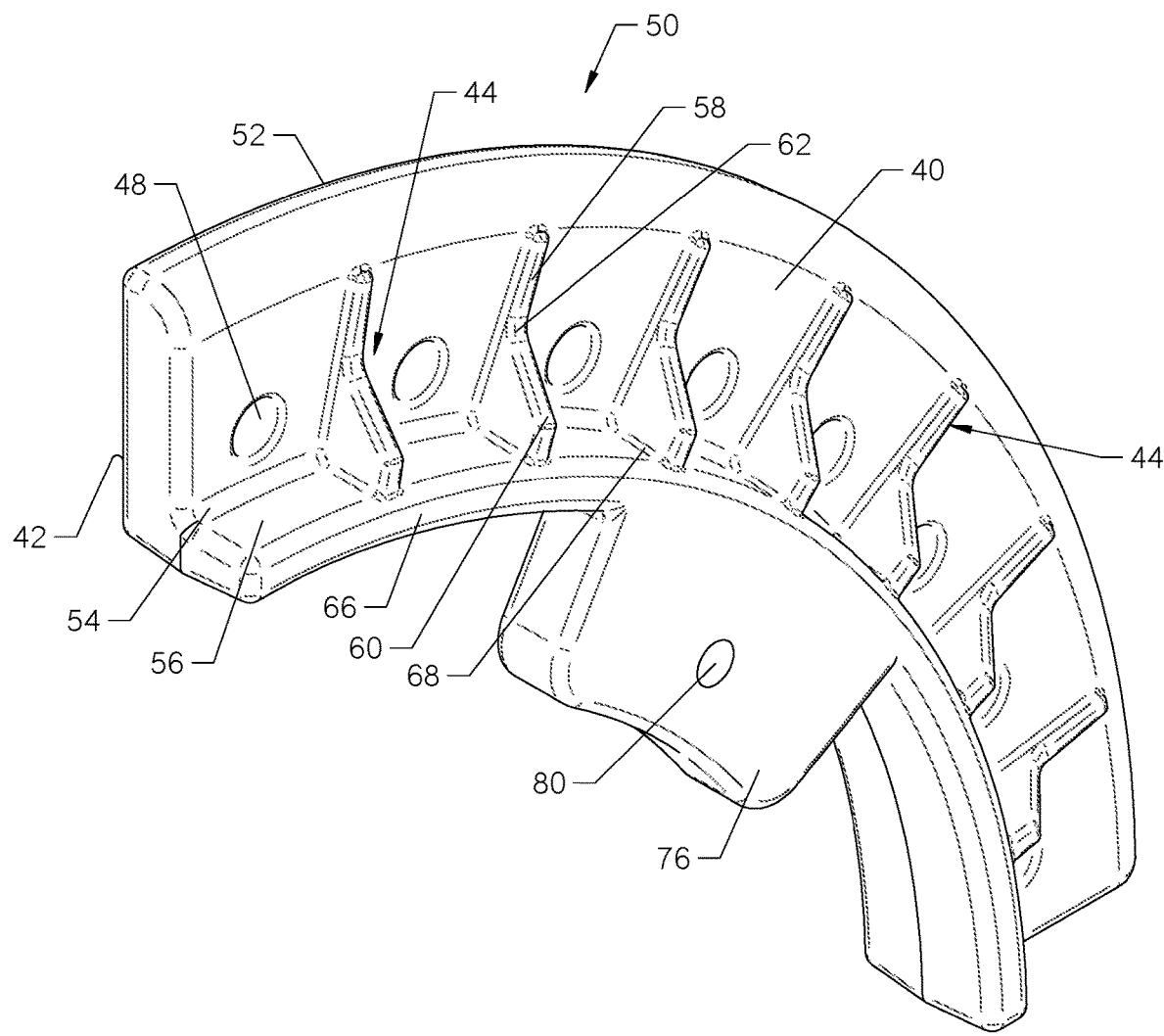
FIG. 3 is a perspective view of a grip surface of a segment of the second grip element of the beadlock.

With reference to FIGS. 1-3, the second grip element 30 has a planar grip surface 40 and a planar second side 42. A plurality of planar rib elements 44 are joined to the grip surface 40 (FIG. 3). The rib elements 44 are angularly spaced about a circular central opening 46 formed in the first grip element 30. Each of the rib elements 44 project from the grip surface 40 at a right angle (FIG. 3). The central opening 46 of the second grip element 30 is concentric with the outer rim 18 and the central opening 36 of the first grip element 28. Alternatively, the second grip element 30 may not have a central opening 46 and may instead have a solid planar center.

A plurality of fastener openings or bolt holes 48 (FIG. 3) are equally spaced around the periphery of the second grip element 30. The bolt holes 48 are formed between each adjacent pair of rib elements 44 and correspond with the bolt holes 38 formed in the first grip element 28.

The second grip element 30 may be formed of a single piece, like the first grip element 38. Alternatively, for ease of manufacturing, the second grip element 30 may be formed of a plurality of segments 50 pieced together to form a ring. For example, the second grip element 30 shown in FIGS. 1-2 comprises four equal segments 50 joined together. One of the segments 50 is shown in FIG. 3.

Continuing with FIG. 3, the grip surface 40 of each segment 50 has a curved top edge 52 and an opposed curved bottom edge 54. A ledge 56 is joined to the grip surface 40 proximate its bottom edge 54. The ledge 56 is orthogonal to the grip surface 40.

The rib elements 44 each comprise a first section 58 that joins a second section 60 at a curve 62 (FIG. 3). The curve 62 is positioned at approximately the same height as a top edge 64 of the bolt holes 48. The second section 60 has a larger surface area than the first section 58. The first section 58 extends from the curve 62 to proximate the top edge 52 of the grip surface 40. The second section 60 tapers downward from the curve 62 to proximate an edge 66 of the ledge 56. Due to this, the second section 60 projects farther out from the grip surface 40 than the first section 58. A base 68 of the second section 60 is supported on the ledge 56.

Figure 4:
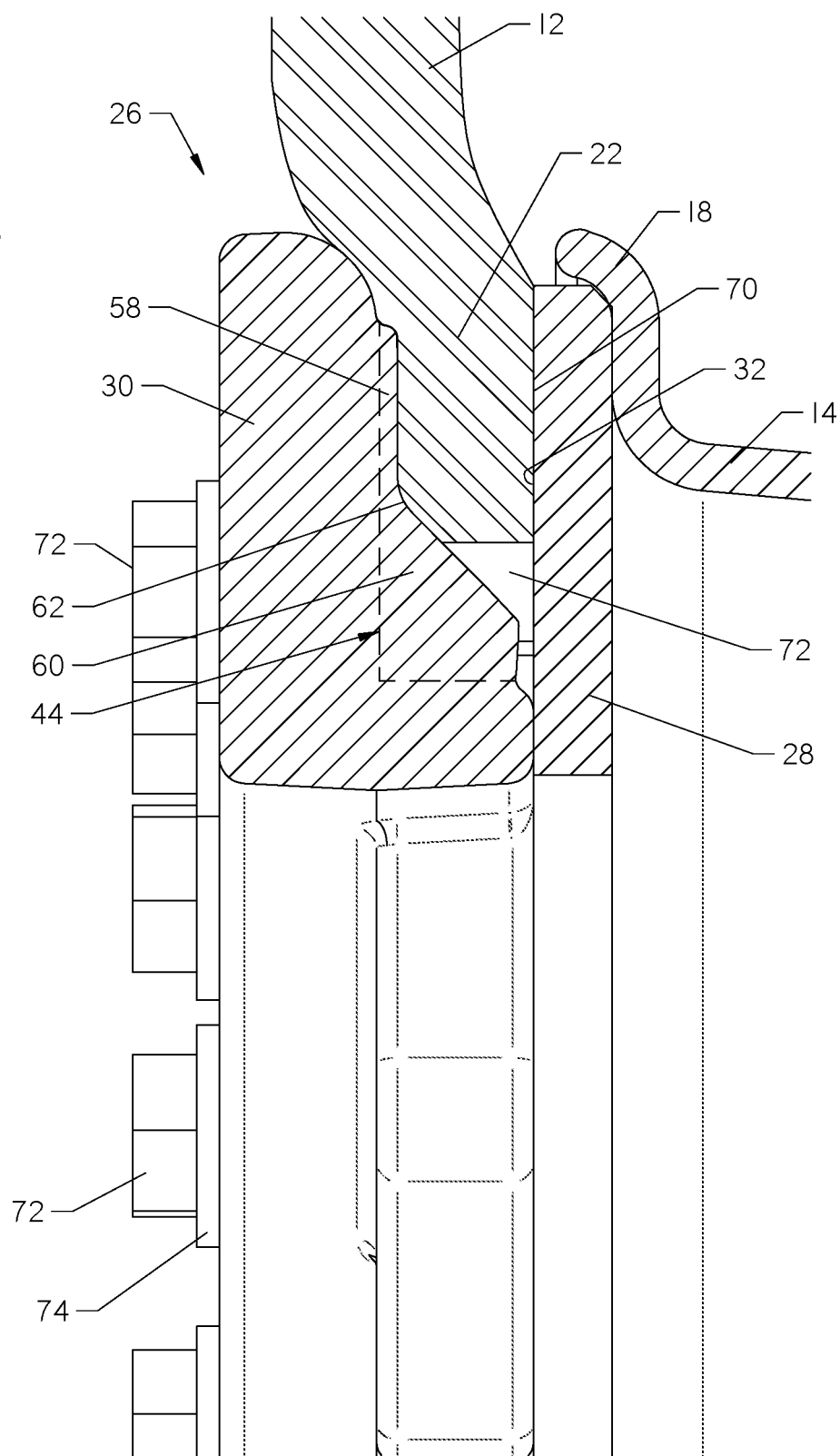
FIG. 4 is a zoomed in cross-sectional view of the assembled beadlock system. A rib element formed on the second grip element is shown out-lined for reference.

With reference to FIG. 4, a cross-section of the bead 22 positioned within the beadlock 26 is shown. In operation, the bead 22 is positioned over the first grip element 28 such that the bead 22 sits just above the bolt holes 38 (FIG. 2). An inner side 70 of the bead 22 is flush with the planar grip surface 32 of the first grip element 28.

The second grip element 30 is positioned on top of the first grip element 28 such that the bead 22 is sandwiched or compressed between the two elements 28, 30. The bead 22 engages with the curve 62 and the second section 60 of each rib element 44 to help center the bead 22 on the beadlock 26. The first section 58 of each rib element 44 will grip the bead 22 and provide friction to prevent rotation of the tire 12 relative the beadlock 26 and the wheel 14. The rib elements 44 may take on different shapes and sizes if desired, as long as the ribs 44 adequately grip the bead 22 and hold the tire 12 in place on the wheel 14.

A plurality of fasteners or bolts 72 and washers 74 are installed in the first and second grip elements 28, 30 to secure the elements together. The bead 22 is shown sitting just above the bolt 72 in FIG. 4. The bead 22 is shown fully secured within the beadlock 26 in FIG. 5. Alternatively, the elements 28, 30 may not have bolt holes 38, 48 and may instead be clamped together using clamps (not shown).

Compression from the second grip element 30 on the bead 22 helps form a tight seal between the inner side 70 of the bead 22 and the grip surface 32 of the first grip element 28. The tight seal helps prevent air from escaping from the tire 12. This is important if the beadlock 22 is used with a construction vehicle having large tires that hold 90-100 pounds of pressure. If such tires lose any pressure, they may no longer adequately carry heaving loads. For this reason, the rib elements 44 are preferably formed on the second grip element 30 rather than the first grip element 28. Forming the rib elements 44 on the first grip element 28 might prevent the inner side 70 of the bead 22 from tightly sealing against the first grip element 28. However, the rib elements 44 may be formed on the first grip element 28, if desired. This may be preferred if the beadlock 26 is used with tires holding significantly less amounts of air pressure.

With reference to FIGS. 1-3, a plurality of attachment members 76 may be formed on the second grip element 30. The attachment members 76 serve as attachment points for a weight 78 (FIG. 1). The attachment members 76 are joined to the bottom edge 54 and ledge 56 of the second grip element 30 and project inward toward the central opening 46 (FIG. 3). An attachment member 76 is shown joined to each segment 50 in FIGS. 1-2. Each attachment member 76 has a fastener opening or bolt hole 80.

Figure 5:
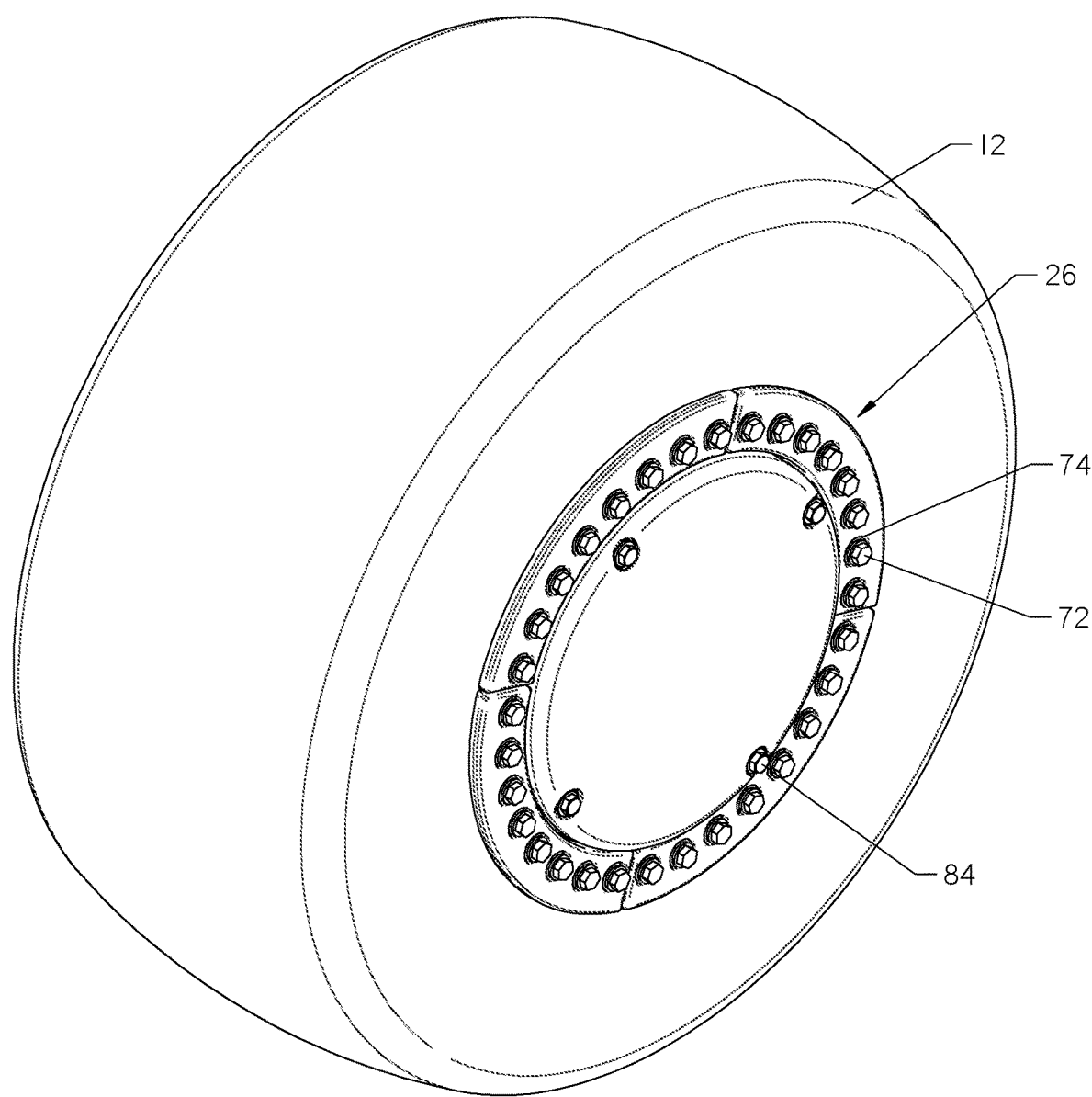
FIG. 5 is a perspective view of the assembled beadlock system.

With reference to FIGS. 1 and 5, the weight 78 may be a circular weight configured to fit within the central opening 46 of the second grip element 30. The weight 78 is used to help counter-balance the weight of the tires 12 throughout the vehicle. The weight 78 has a plurality of fastener openings or bolt holes 82 that correspond with the holes 80 in the attachment members 76 (FIG. 1). A plurality of fasteners or bolts 84 are used to secure the weight 78 to the attachment members 76, as shown in FIG. 5. If the second grip element 30 does not have a central opening 46, the weight 78 may be secured directly to the side of the element 30. The weight 78 may also be secured to the inside of the wheel 14, if desired.

Turning back to FIGS. 2-3, if the second grip element 30 is not manufactured in segments 50, the second grip element 30 may be formed of two separate rings (not shown) for ease of manufacturing. The rib elements 44 may be formed on a first ring such that the ribs 44 extend past the periphery of the ring. A second ring may then be placed on top of the first ring so as to cover the ribs 44.

Changes may be made in the construction, operation and arrangement of the various parts, elements, steps and procedures described herein without departing from the spirit and scope of the invention as described in the following claims.

The invention claimed is:

1. A system comprising: a wheel;
   a first grip element mounted on the wheel and having a planar grip surface extending about a central opening;
   a second grip element having a planar grip surface extending about a central opening and secured to the first grip element; and
   a tire installed on the wheel and having a bead sandwiched between the grip surfaces of the first and second elements;
   in which a plurality of rib elements project from the grip surface of at least one of the grip elements, wherein the distance in which the rib elements project from the grip surface is characterized as a height, each of the rib elements having a length and a width, the length being longer than the width; and
   in which the length of each of the rib elements extends radially relative to the central opening of the grip element on which it is disposed;
   in which each of the rib elements comprises a first section and a second section, the first section having a substantially greater height than the second section;
   the bead of the tire extends radially over and radially inward of the second section; and
   in which the plurality of rib elements are angularly spaced about the central opening of the grip element on which it is disposed.

2. The system of claim 1 in which the first grip element and the second grip element are each shaped like a ring.

3. The system of claim 1 in which the grip element having the plurality of rib elements project from its grip surface comprises a plurality of segments joined together to form a ring.

4. The system of claim 1 in which the first grip element has a plurality of bolt holes spaced around its periphery.

5. The system of claim 4 in which the second grip element has a plurality of bolt holes spaced around its periphery that correspond with the bolt holes formed in the first grip element.

6. The system of claim 5 further comprising a plurality of bolts, each bolt positioned within a corresponding pair of bolt holes in the first and second elements.

7. The system of claim 4 in which a bolt hole is formed between each of the plurality of rib elements and an immediately adjacent one of the plurality of rib elements.

8. The system of claim 1 in which each rib element projects from the grip surface of at least one of the grip elements at a right angle.

9. The system of claim 1 further comprising a weight secured to one of the grip elements, in which the weight is disposed within the central opening of the second grip element.

10. A beadlock comprising:
    a first grip element having a planar grip surface and a plurality of peripheral bolt holes;
    a second grip element having a planar grip surface and a plurality of peripheral bolt holes corresponding with the plurality of bolt holes in the first grip element; and
    a plurality of bolts, each bolt receivable within a corresponding pair of bolt holes within the first and second grip elements, and
    a plurality of elongate rib elements, each of the rib elements being disposed along a discrete radius of at least one of the grip elements;
    in which each rib element projects from the grip surface of either the first or second grip elements, wherein the distance in which each rib element projects from the respective surface is characterized as a height, each of the rib elements having a length and a width, the length being longer than the width; and in which the length of each of the plurality of rib elements extends radially relative to a center axis of a wheel corresponding with the beadlock;

in which each of the rib elements comprises a first section and a second section, the first section having a substantially greater height than the second section such that a bead of a tire extends radially over and radially inward of the second section; and in which the grip element having the plurality of rib elements projecting from its grip surface comprises a plurality of segments joined together to form a ring, wherein each of the rib elements is angularly spaced relative to the center of the ring.

11. The system of claim 10 in which the grip element having the plurality of rib elements is characterized as the first grip element and wherein the second grip element is shaped like a ring.

12. The beadlock of claim 10 in which each rib element projects from the grip surface at a right angle.

13. A method comprising:
installing a tire on a wheel;
securing a bead of the tire to the beadlock of claim 10.

14. An apparatus, comprising:
a wheel with a tire that includes a tire bead,
a curved wall mounted on the wheel having a curved top edge and an opposed curved bottom edge, each of the curved top edge and opposed curved bottom edge terminating at opposed ends;
a ledge joined to an outer surface of the wall proximate its bottom edge, in which the ledge is orthogonal to the wall; and
a plurality of planar rib elements angularly spaced about the wall relative to the center of curvature of the top edge,
each rib element joined to and projecting from the outer surface of the wall, each rib element having a length, a width, and a height, the length extending radially relative to a central axis of the wheel and a width, the length being longer than the width, the height is the distance in which each rib element projects from the outer surface of the wall;
each rib element has a first section and a second section, the height of the first section is substantially greater than the height of the second section and wherein the tire bead extends radially over and radially inward of the second section of each of the rib elements.

15. The apparatus of claim 14 in which the first section joins the second section at a curve, in which the second section extends from the curve to proximate the top edge of the wall and the first section tapers downward from the curve to an edge of the ledge.

16. The apparatus of claim 15 in which the first section has a larger surface area than the second section.

17. The apparatus of claim 14 in which a fastener opening is formed in the wall at a position intermediate each-of the plurality of rib elements and an immediately adjacent one of the plurality of rib elements.

18. The apparatus of claim 14 in which each of the rib elements are joined to the outer surface of the wall at a right angle.

19. A kit comprising:
a plurality of the apparatus of claim 14, in which the ends of the wall of each apparatus subtends a central angle of less than 360 degrees and in which the central angles of the plurality sum to 360 degrees.

20. The system of claim 5 in which:
the bead extends between the first grip element and the second grip element to a position at the periphery of each that is radially outward of the corresponding bolt holes on the first grip element and second grip element; and in which each of the plurality rib elements extends to a position which is radially inward of the corresponding bolt holes on the first grip element and the second grip element.

21. The beadlock of claim 10 in which the edge of the bolt holes distal from the center of the ring is at approximately the same distance from the center of the ring as the curve of each of the rib elements.

* * * * *

UNITED STATES PATENT AND TRADEMARK OFFICE
CERTIFICATE OF CORRECTION

PATENT NO. : 10,953,691 B2
APPLICATION NO. : 15/788452
DATED : March 23, 2021
INVENTOR(S) : Buck et al.

Page 1 of 1

It is certified that error appears in the above-identified patent and that said Letters Patent is hereby corrected as shown below:

In the Claims

Column 4, Claim 7, Line 1, please delete "4" and substitute therefore "1".

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*